United States Patent
Kim et al.

(10) Patent No.: US 11,256,996 B2
(45) Date of Patent: Feb. 22, 2022

(54) METHOD FOR RECOMMENDING NEXT USER INPUT USING PATTERN ANALYSIS OF USER INPUT

(71) Applicant: SAMSUNG SDS CO., LTD., Seoul (KR)

(72) Inventors: Ji Hye Kim, Seoul (KR); Seung Hyun Yoon, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 203 days.

(21) Appl. No.: 16/668,278

(22) Filed: Oct. 30, 2019

(65) Prior Publication Data

US 2020/0134488 A1 Apr. 30, 2020

(30) Foreign Application Priority Data

Oct. 30, 2018 (KR) .................. 10-2018-0130843

(51) Int. Cl.
*G06N 5/04* (2006.01)
*G06F 3/0484* (2013.01)
*G06F 3/0481* (2013.01)

(52) U.S. Cl.
CPC ............. *G06N 5/04* (2013.01); *G06F 3/0484* (2013.01); *G06F 3/04817* (2013.01)

(58) Field of Classification Search
CPC ..... G06F 3/0484; G06F 3/04817; G06N 5/05; G06N 5/04
See application file for complete search history.

(56) References Cited

U.S. PATENT DOCUMENTS

| | | | |
|---|---|---|---|
| 6,323,884 B1* | 11/2001 | Bird | G06F 3/04812 715/810 |
| 2004/0243257 A1* | 12/2004 | Theimer | H04M 1/72454 700/44 |
| 2008/0034128 A1* | 2/2008 | Evans | G06F 9/451 710/18 |
| 2009/0193362 A1* | 7/2009 | DeMers | G06F 3/0482 715/835 |
| 2015/0160811 A1* | 6/2015 | Shah | G06F 3/0482 715/855 |
| 2016/0173568 A1* | 6/2016 | Penilla | H04L 67/10 709/217 |
| 2017/0249017 A1* | 8/2017 | Ryu | G06F 3/0237 |
| 2018/0365025 A1* | 12/2018 | Almecija | G06F 9/451 |

* cited by examiner

*Primary Examiner* — Tadesse Hailu
(74) *Attorney, Agent, or Firm* — The PL Law Group, PLLC

(57) ABSTRACT

Methods for recommending next user input using pattern analysis of user input is provided. According to an aspect of the present disclosure, a method comprising obtaining information on a series of user inputs entered through a graphic user interface (GUI), analyzing the information on the series of user inputs to identify a pattern formed by the series of user inputs, and when the pattern is identified, automatically displaying next input recommendation information determined depending on the identified pattern and a last user input of the series of user inputs without additional user input after the series of user inputs, is provided.

12 Claims, 14 Drawing Sheets

METHOD FOR RECOMMENDING NEXT USER INPUT USING PATTERN ANALYSIS OF USER INPUT

CROSS-REFERENCE TO RELATED APPLICATION AND CLAIM OF PRIORITY

This application claims the benefit of Korean Patent Application No. 10-2018-0130843, filed on Oct. 30, 2018, in the Korean Intellectual Property Office, the disclosure of which is incorporated herein by reference in its entirety.

BACKGROUND

1. Technical Field

The present invention relates to a method for recommending a next user input using pattern analysis of a user input. More particularly, the present invention relates to a method for analyzing a pattern of a series of user inputs entered through a graphical user interface (GUI) and recommending a user input to be input later.

2. Description of the Related Art

A process required for computer program development may be largely divided into a process of designing a program structure and a process of writing a program in a computer language, that is, a coding process according to the design.

Various methods have been developed in the process of designing the structure of a program, but the most effective, efficient, and widely used method is to draw a design of a program using a flowchart.

The flowchart is a design drawing that explains, after the program starts, when it receives an input from a program user, what processing is done with the input information, what operations are performed, when it outputs a result, and then when it ends the program. The flowchart has a benefit that the program may be designed to proceed using a logical flow.

Due to the benefit of such a flowchart, there is an increasing number of services that implement an intuitive logical flow, which is implemented through a graphical user interface (GUI) such as Chatbot Builder, Rule manager, and workflow management programs.

In the case of a conventional authoring tool for creating content having a flowchart form, the main components such as cards, control boxes, or the like that make up the flowchart are selected in a list area on the top or left side of the GUI of the flowchart, and are dragged and dropped or clicked to be added to the current flowchart. In this way, users who are not familiar with flowchart programs may easily find out what components are in the GUI. However, it causes inefficiency in that professional user of the flowchart program should browse the list of components each time.

SUMMARY

Aspects of the present invention provide a method for recommending a next user input and a device executing the method, comprising: analyzing information on a series of user inputs entered through a GUI to identify patterns formed by the series of user inputs; and when a pattern is identified, automatically displaying next input recommendation information determined depending the identified pattern and the last user input of the series of user inputs without additional user input after the series of user inputs, thereby allowing a user to reduce a cumbersome process such as re-searching a list of components in order to add components constituting a flowchart.

Aspects of the present invention also provide a method for recommending a next user input and a device executing the method, comprising: providing next input recommendation information appropriate to a situation based on a pattern of a series of user inputs, thereby allowing a beginner to easily produce a flowchart as well as an advanced user skilled in an authoring tool.

Aspects of the present invention also provide a method for recommending a next user input on an authoring tool for a user other than an advanced user and a device executing the method, in which the method and device are based on various patterns identified in a user input to the authoring tool of the advanced users skilled in the authoring tool.

However, aspects of the present invention are not restricted to those set forth herein. The above and other aspects of the present invention will become more apparent to one of ordinary skill in the art to which the present invention pertains by referencing the detailed description of the present invention given below.

According to an aspect of the present disclosure, a method for recommend a next user input, performed by a computing device is provided. The method comprises obtaining information on a series of user inputs entered through a graphic user interface (GUI), analyzing the information on the series of user inputs to identify a pattern formed by the series of user inputs, and when the pattern is identified, automatically displaying next input recommendation information determined depending on the identified pattern and a last user input of the series of user inputs without additional user input after the series of user inputs.

According to an embodiment, automatically displaying may comprise displaying the next input recommendation information at a position within a predetermined distance from a pointer for manipulating the graphical user interface.

According to an embodiment, the GUI may be a GUI of an authoring tool to create contents in the form of a flowchart, and the identifying the pattern formed by the series of user inputs may comprise, in response to the last user input in which information writing for a process included in an ongoing flowchart shown in a work screen of the authoring tool is completed, analyzing the information on the series of user inputs and identifying the pattern formed by the series of user inputs. The identified pattern may comprise a first pattern in which a user input to which a process having a first attribute is added to the ongoing flowchart is consecutively and repeatedly input equal to or more than a predetermined number of times, wherein automatically displaying the next input recommendation information determined depending on the identified pattern and the last user input of the series of user inputs without additional user input after the series of user inputs may comprise, when the pattern formed by the series of user inputs includes the first pattern and the last user input is a user input for adding the process having the first attribute, displaying the next input recommendation information that indicates to add the process having the first attribute to the ongoing flowchart. Automatically displaying the next input recommendation information determined depending on the identified pattern and the last user input of the series of user inputs without additional user input after the series of user inputs may further comprise when the pattern formed by the series of user inputs does not include the first pattern, determining a high frequency process attribute to be added to the next input recommendation information based on the number of times added to the ongoing flowchart, and displaying the next input recommendation information that indicates to add a process with the high frequency process attribute to the ongoing flowchart. Automatically displaying the next input recommendation information determined depending on the identified pattern and the last user input of the series of user inputs without additional user input after the series of user inputs may further comprise, determining a high frequency process attribute to be added to the next input recommendation information based on the number of times added to the ongoing flowchart, and further displaying the next input recommendation information that indicates to add a process with the high frequency process attribute to the ongoing flowchart as a subordinate of the next input recommendation information that indicates to add the process with the first attribute to the ongoing flowchart. The identified pattern may comprise a second pattern in which a cycle is repeatedly input equal to or more than a predetermined number of times, the cycle consisting of sequentially adding processes with a plurality of different attributes to the ongoing flowchart. Automatically displaying the next input recommendation information determined depending on the identified pattern and the last user input of the series of user inputs without additional user input after the series of user inputs may comprise, when the pattern formed by the series of user inputs includes the second pattern and the last user input is a user input for adding a process with the last attribute included in the cycle to the ongoing flowchart, displaying the next input recommendation information that indicates to add the process with the plurality of attributes included in the cycle to the ongoing flowchart.

According to another aspect of the present disclosure, a method for recommend a next user input, performed by a computing device is provided. The method comprises obtaining information on a series of user inputs entered through a graphic user interface (GUI), determining whether a pattern matching the information on the series of user inputs is present among a plurality of patterns included in pre-stored pattern information, and when the pattern matching the information on the series of user inputs exists, automatically displaying next input recommendation information depending on the matched pattern without additional user input after the series of user inputs.

According to an embodiment, the pattern information may consist of a pattern identified in a series of user inputs of another user other than a user of the computing device and be downloaded to the computing device via a network.

According to an embodiment, the GUI may be a GUI of an authoring tool to create contents in the form of a flowchart, wherein determining whether the pattern matching the information on the series of user inputs is present among the plurality of patterns included in the pre-stored pattern information may comprise, in response to a last user input in which information writing for a process included in an ongoing flowchart shown in a work screen of the authoring tool is completed, determining whether there is a match between the information on the series of user inputs and one or more pre-stored pattern information. The next input recommendation information depending on the matched pattern information may indicate to sequentially batch process a plurality of user inputs sequentially in an order according to a pattern matching the information on the series of user inputs. The next input recommendation information depending on the matched pattern information may comprise a first GUI object that indicates to sequentially batch process a plurality of user inputs sequentially in an order according to a first pattern that matches the information on the series of user inputs, and a second GUI object that indicates to process a single user input according to a second pattern that matches the information on the series of user inputs.

According to still another aspect of the present disclosure, a method for recommend a next user input, performed by a computing device equipped with an authoring tool for creating contents in the form of a flowchart, is provided. The method comprises obtaining a position of a pointer, determining whether the position of the pointer for manipulating a graphical user interface (GUI) of the authoring tool is positioned within a predetermined distance from an arrow constituting an ongoing flowchart displayed on a work screen of the authoring tool, and when the pointer is positioned within the predetermined distance from the arrow, automatically displaying next input recommendation information including a control box for defining a flow of the ongoing flowchart without additional user input.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE EMBODIMENTS

Figure 1:
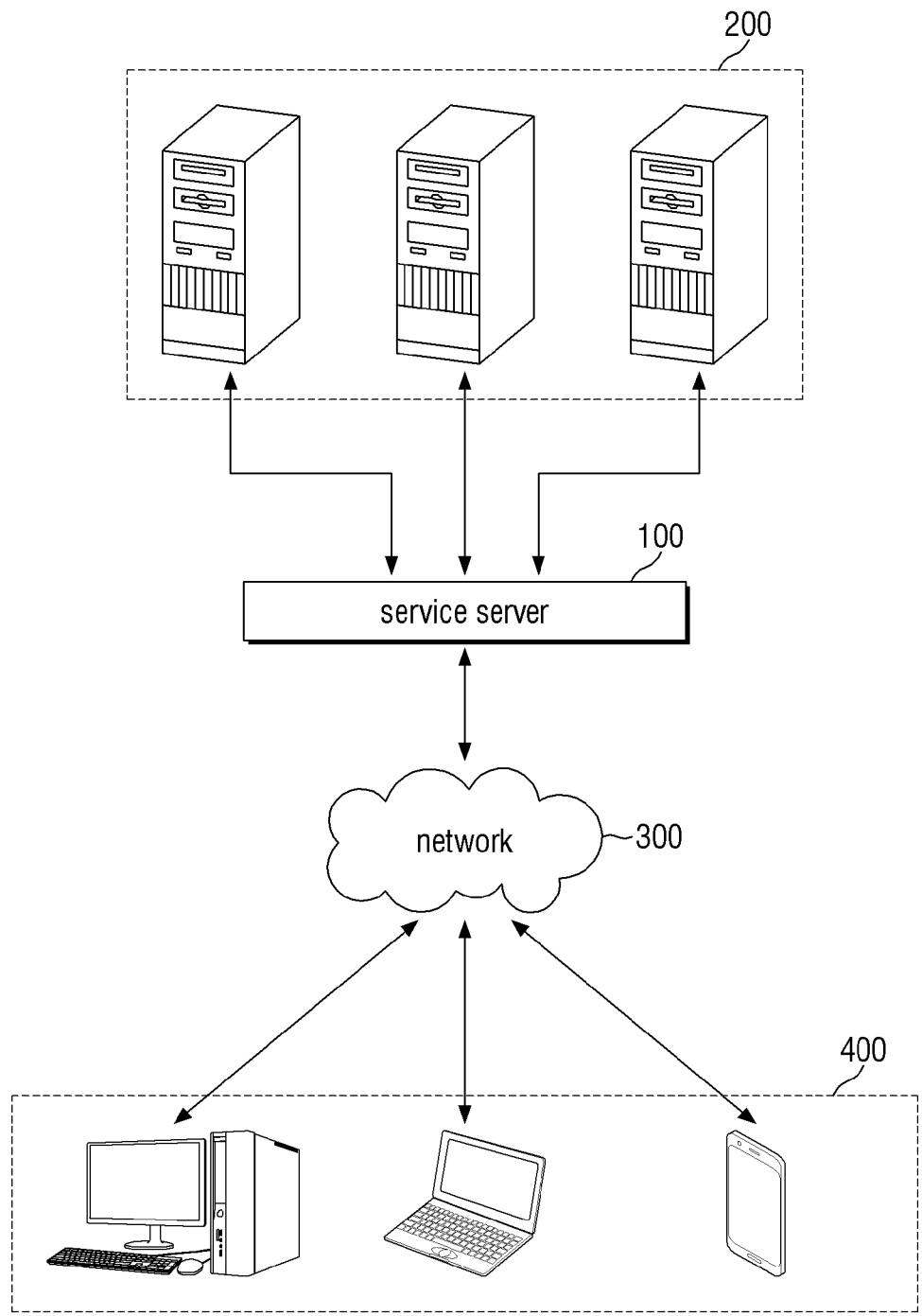
FIG. 1 is a service system configuration diagram of a service system according to an embodiment of the present invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, some embodiments of the present invention will be described with reference to the drawings.

FIG. 1 is a diagram schematically showing a service system according to an embodiment of the present invention.

Referring to FIG. 1, the service system according to an embodiment of the present invention may include a service server 100 and an external server 200.

First, the service server 100 may transmit data for implementing a graphical user interface (GUI) that is a target of user input to the user terminal 400. Hereinafter, the graphic user interface will be abbreviated as "GUI."

In the present invention, the GUI is to be understood as meaning all forms of user interface with graphical elements displayed to accept a user input, as it is interpreted universally. For example, the GUI may constitute an authoring tool for authoring content such as a document, presentation material, animation, UI/UX prototype, or the like.

The GUI may also constitute an authoring tool for creating contents having a flowchart form. An example of content having the flowchart form includes a chatbot dialog model, a workflow, or the like.

As described above, the GUI may be provided by the service server 100. In other words, the authoring tool may be a web-based authoring tool using a technology such as Software-as-a-Service (SaaS). Unlike FIG. 1, the authoring tool may be configured in the form of a client program installed in the user terminal 400. Here, it should be noted that a method according to some embodiments of the present invention described later may be executed in the client program installed in the user terminal 400.

Hereinafter, for the sake of understanding, embodiments will be described on the assumption that the authoring tool is a web-based authoring tool.

The service server 100 may obtain information on a series of user inputs entered through the GUI provided to the user terminal 400 through a network 300, analyze a pattern for the user inputs using the information on the series of user inputs, and use the analyzed pattern to provide information on a next input recommendation that may be input after the last user input. In this way, a user of the user terminal 400 may obtain an experience in which the next input recommendation information is displayed on a screen only by completing the pattern of a series of user inputs without any user input for obtaining a recommendation for a next input. In some embodiments, the next input recommendation information is displayed adjacent to a cursor, so that the user may speed up an authoring work through the GUI.

The external server 200 may store one or more pattern information including a plurality of patterns consisting of the series of user inputs. For example, the external server 200 may be a pattern information storage server including a storage device capable of storing a plurality of pattern information. Each of the pattern information may be matched and stored with identification information of a GUI to be applied. Further, the external server 200 may provide the service server 100 with pattern information having the identification information of the GUI provided by the service server 100.

In an embodiment, one piece of pattern information is generated per user. This means that when recommending a next user input for a user, only that user's user input is referenced. According to another embodiment, one piece of the pattern information is generated for a plurality of users. This means that when recommending a next user input for a user, not only that user's user input, but also a user input of another user is referenced. According to another embodiment, the pattern information may be generated based on an attribute of a user who uses the GUI. In other words, input patterns identified in user inputs of users having the same attribute may be generated as pattern information of the users having the same attribute.

The user terminal 400 may display a GUI provided by the service server 100, and may provide the series of user inputs entered through the GUI to the service server 100 through the network 300. For example, the user terminal 400 may include a terminal such as a smartphone, a PC, a laptop, and a PDA, provided with a display capable of displaying the GUI. However, it is not limited thereto, and any device capable of using the GUI provided by the service server 100 may be used as the user terminal 400.

An operation of the service system according to the embodiment will be described below.

In an embodiment in which the service server 100 provides the GUI, the user terminal 400 displaying the GUI transmits the information on the series of user inputs entered through the GUI to the service server 100. The service server 100 analyzes the information on the series of user inputs and identifies a pattern formed by the series of user inputs. If the pattern is identified, the service server 100 transmits the next input recommendation information determined depending on the identified pattern and the last user input of the series of user inputs to the user terminal 400. The user terminal 400 automatically displays the next input recommendation information without additional user input after the series of user inputs.

In another embodiment in which the service server 100 provides the GUI, the user terminal 400 displaying the GUI transmits the information on the series of user inputs entered through the GUI to the service server 100. The service server 100 analyzes the information on the series of user inputs and determines whether a pattern matching the information on the series of user inputs exists among a plurality of patterns included in the pre-stored pattern information. If there is a pattern that matches the information on the series of user inputs, the service server 100 transmits the next input recommendation information determined depending on the identified pattern and the last user input of the series of user inputs to the user terminal 400. The user terminal 400 automatically displays the next input recommendation information without additional user input after the series of user inputs.

In an embodiment in which the service server 100 provides the GUI, most operations may be performed in the user terminal 400 for fast user feedback without network lack. In the embodiment, the user terminal 400 displaying the GUI obtains the information on the series of user inputs entered through the GUI. The user terminal 400 analyzes the information on the series of user inputs and identifies a pattern formed by the series of user inputs. If the pattern is identified, the user terminal 400 automatically displays the next input recommendation information determined depending on the identified pattern and the last user input of the series of user inputs, without additional user input after the series of user inputs.

In another embodiment where the service server 100 provides the GUI, the user terminal 400 displaying the GUI is analyzes the information on the series of user inputs entered through the GUI, and determines whether a pattern matching the information on the series of user inputs exists among a plurality of patterns included in the pre-stored pattern information. If there is a pattern that matches the information on the series of user inputs, the user terminal 400 automatically displays the next input recommendation information determined depending on the identified pattern and the last user input of the series of user inputs, without additional user input after the series of user inputs.

Referring to FIGS. 2 to 14, a method for recommending a next user input according to some embodiments of the present invention will be described. Each operation included in the method according to the embodiment may be performed by a computing device. Here, all operations pertaining to the method of the embodiment may be performed by one computing device. However, it should be noted that some operations pertaining to the method of the embodiment may be performed by a first computing device, and at least some of the remaining operations may be performed by a second computing device.

Figure 2:
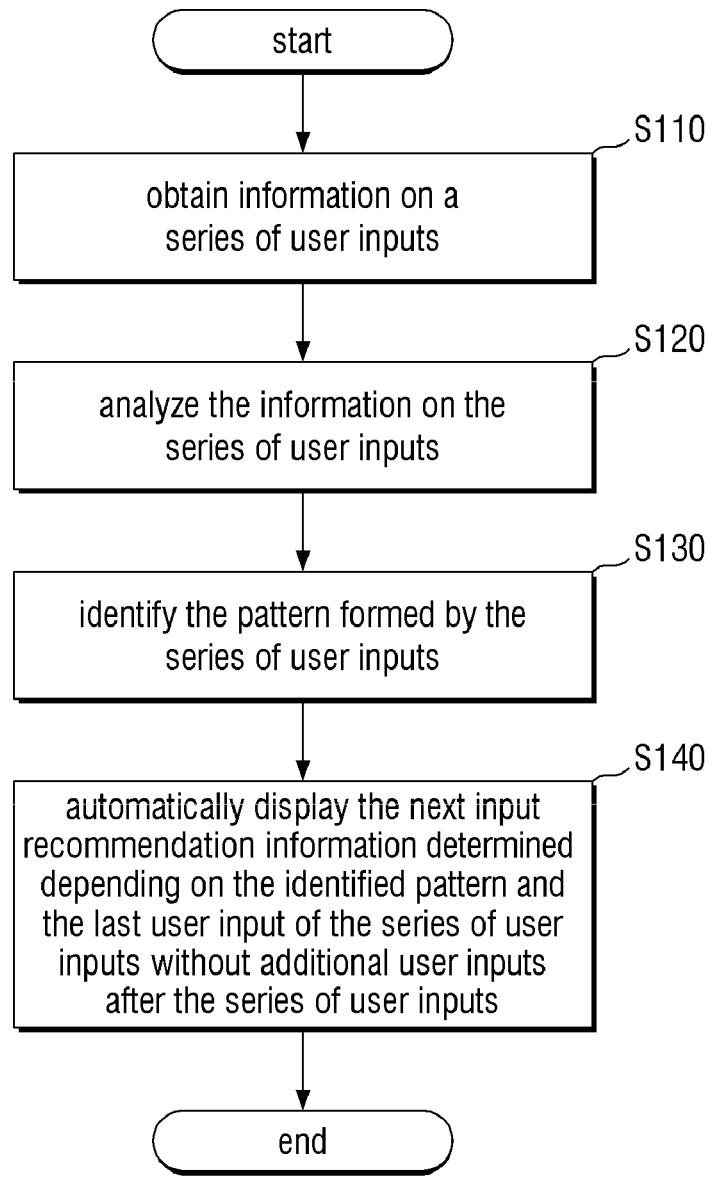
FIG. 2 is a flowchart illustrating a method for recommending a next user input according to another embodiment of the present invention.
Figure 3:
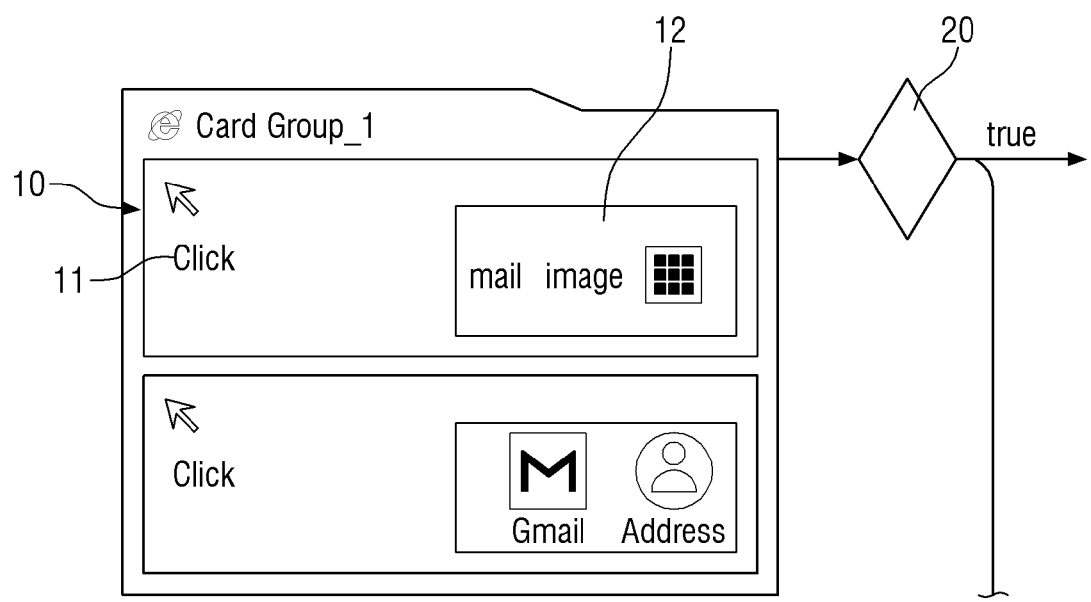
FIG. 3 is a diagram showing a GUI of a tool for authoring content in a flowchart form output to a user terminal in some embodiments of the present invention.
Figure 4:
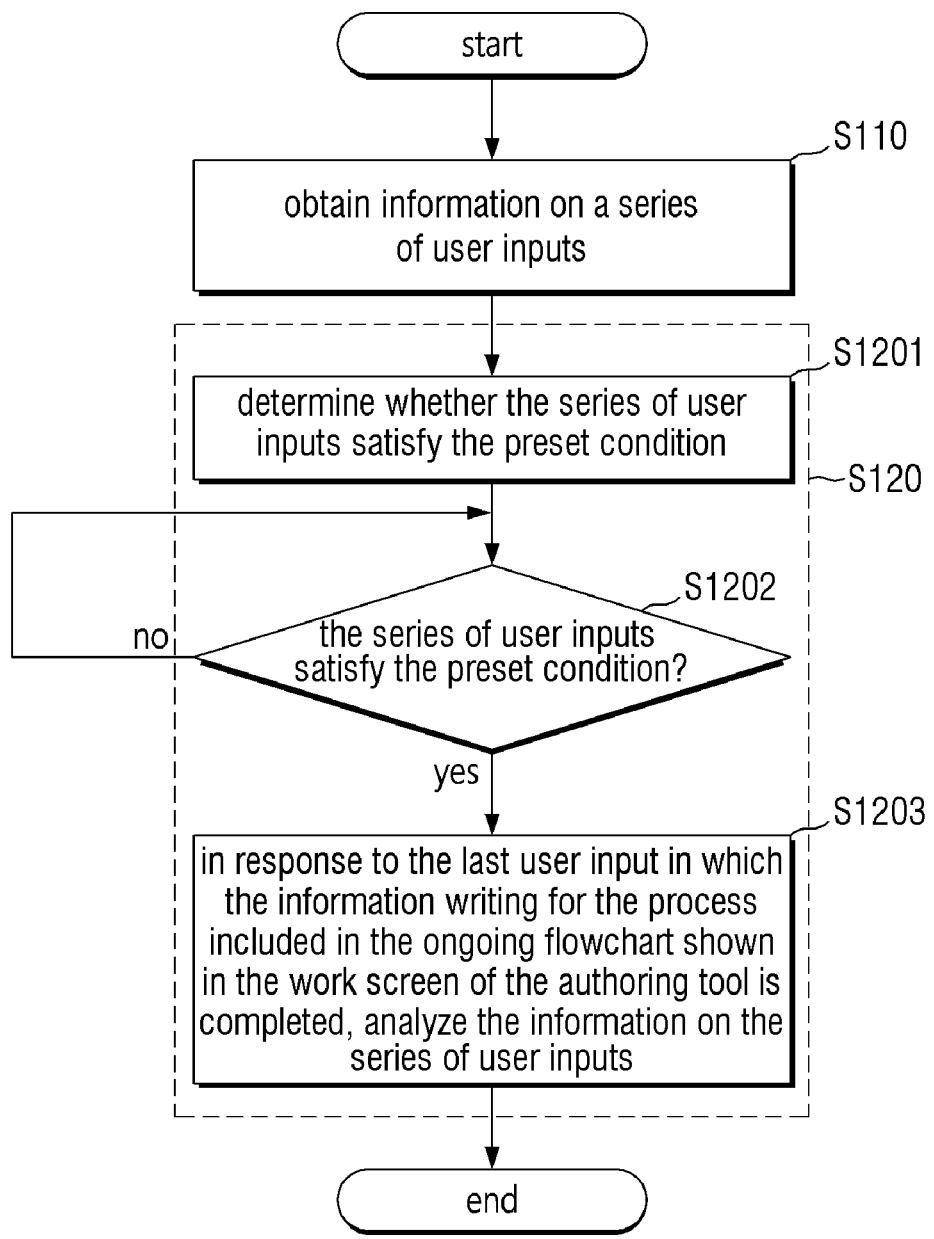
FIG. 4 is a flowchart explaining in more detail an operation of the method described with reference to FIG. 2.

FIG. 2 is a flowchart illustrating a method for recommending a next user input according to another embodiment of the present invention. For convenience of understanding, the GUI is assumed to constitute an authoring tool for creating contents having a flowchart form, and such a GUI will be described as a "flowchart GUI."

First, the service server 100 may obtain the information on the series of user inputs entered through the GUI (S110). Hereinafter, with reference to FIG. 3, a flowchart output to the user terminal 400 will be described for information on a user input entered through the GUI.

The series of user inputs refers to information that is input for producing a flowchart using the flowchart GUI. For example, the series of user inputs may include one or more of an input for adding a process 10 constituting a flowchart, an input for changing a name 11 of the added process, an input for adding a control box 20 constituting the flowchart, an input for setting/resetting a target image 12 of a flowchart process, and an input for defining or changing a process group that contains a plurality processes. As may be seen from an example of such a user input, it is to be understood that the user input mentioned herein refers to any manipulation, not pointing to a unit user input such as pointer movement, left click, right click, or the like. Even if the existing user input pattern matches, the unit user input, such as simple pointer movement, left click, and right click, may be different at the time. Therefore, they are difficult to predict as the next user input.

It will be described with reference to FIG. 2 again. In step S120, the information on the series of user inputs is analyzed. As described above, the analysis may be performed at the service server or at the user terminal. It will be appreciated that the analysis refers to executing one or more instructions to identify the series of user manipulations using the flowchart GUI, not to analyze a low level user input such as simply tracking a path of a pointer.

Next, in step S130, the pattern formed by the series of user inputs is identified. The operation may also be performed by the service server or by the user terminal. In an embodiment, identification of the pattern is performed each time there is a new user input. On the other hand, in another embodiment, the pattern is identified only when the new user input satisfies a preset condition in order to prevent a speed reduction problem due to an unnecessary pattern identification operation. In this regard, it will be described with reference to FIG. 4.

It is determined whether the series of user inputs satisfy the preset condition by using the information on the series of user inputs obtained through step S110 (S1201).

Here, the preset condition may be defined as passing the condition if the last user input indicates an input for completing information writing for a process included in an ongoing flowchart shown on a work screen of the authoring tool. More specifically, the input for completing the information writing may be a user input for completing a name change for a process added to a flowchart, a user input for completing a group change of the flowchart process, a user input for completing a reset of a target image, or the like. For example, if an enter key is input after a name change for a process added to a flowchart, a target image reset, or a group change in a flowchart process, it may be determined that the condition is satisfied at the time when the enter key is input.

In other words, if a user input of one or more of an operation that completes the name change for the process added to the flowchart, an operation to reset the target image, and an operation to complete the group change of the flowchart process is input from the flowchart GUI, the service server 100 may determine that the series of user inputs satisfy the preset condition (S1202).

After step S1202, in response to the last user input in which the information writing for the process included in the ongoing flowchart shown in the work screen of the authoring tool is completed, the information on the series of user inputs may be analyzed (S1203).

It will be described with reference to FIG. 2 back again. In step S130, the pattern formed by the series of user inputs may be identified based on an analysis result in step S120 (S130). The operation may also be executed in the service server or the user terminal similarly to step S120.

For example, if the series of user inputs repeatedly includes [add process with click attribute—change name of process—reset target image 12 of process], the repeated input [add process with click attribute—change name of process—reset target image 12 of process] may be identified as one pattern.

After step S130, if a pattern for the series of user input is identified in step S130, the service server 100 may automatically display the next input recommendation information determined depending on the identified pattern and the last user input of the series of user inputs without additional user inputs after the series of user inputs (S140). Hereinafter, referring to FIG. 5, the next input recommendation information displayed in the flowchart GUI will be described.

Figure 5:
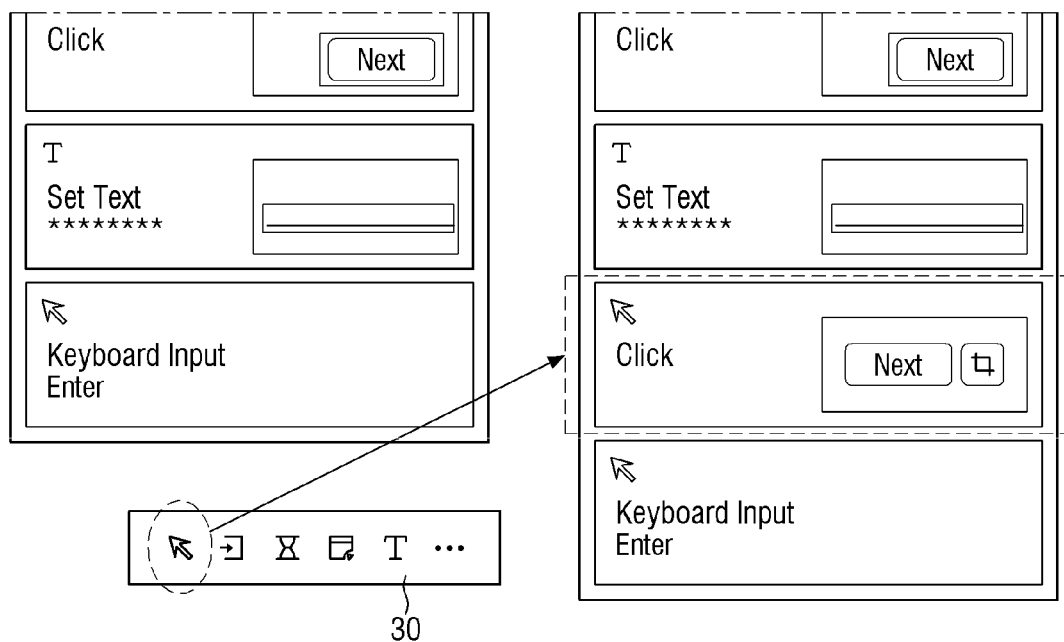
FIG. 5 is a diagram illustrating an example in which content which is working on is updated when a recommended next input is selected, according to some embodiments of the present invention.

Referring to FIG. 5, when the pattern for the series of user inputs entered through the flowchart GUI is identified, the next input recommendation information 30 determined depending on the identified pattern and the last user input of the series of user inputs may be automatically displayed. Here, the phrase "automatically displayed" means that the next input recommendation information 30 is displayed in a situation in which there is no additional user input after the last user input.

Here, the next input recommendation information 30 means recommendation information on the user input to be input after the last user input of the series of user is input using the identified pattern. In other words, the next input recommendation information 30 means information on a user input that is likely to be input after the last user input of a plurality of types of user inputs that may be entered through the flowchart GUI, and is based on the identified pattern. As already described, the term "a series of user inputs" herein does not mean a low-level user input such as pointer movement. Therefore, it may be understood that each next input recommendation included in the next input recommendation information 30 also refer to a recommendation for a next manipulation of the flowchart GUI (e.g. adding a particular type of process), not a recommendation for the low-level user input.

More specifically, if the series of user inputs includes a repetition of [add process with click attribute—add process with text input attribute—input enter key], the repeated user input will be identified as a pattern. If the last user input is "inputting an enter key after adding process of a text input attribute," the next input recommendation information 30 including the "add process with click attribute" will be automatically displayed after inputting the enter key.

Here, if the user selects the "add process with click attribute" included in the next input recommendation information 30 displayed, the click attribute process will be added to the ongoing flowchart.

In an embodiment, the next input recommendation information 30 may be displayed at adjacent positions within a predetermined distance from a pointer for manipulating the flowchart GUI. As a result, the speed of the work may be improved by reducing a distance of the user's pointer, and the user's attention may be obtained.

For example, the next input recommendation information 30 may be displayed in the form of a floating tool bar, as shown in FIG. 5, and may be displayed in a lower right corner adjacent to the pointer. In addition, each recommendation next manipulations included in the next input recommendation information 30 may be displayed in the form of an icon as shown in FIG. 5. Here, each icon may be arranged inside the next input recommendation information 30 so that an icon of the recommendation next manipulation having a higher priority is disposed at a position adjacent to the pointer. As a result, a recommended next manipulation having a higher priority may shorten a movement distance of the pointer, thereby obtaining an effect of making selection easier.

In an embodiment, the service server 100 may obtain position information of the pointer, and when the pointer is positioned on a specific shortcut icon, the shortcut icon may be changed to display its attribute. For example, the service server 100 may display a shortcut icon for inputting the "add process with click attribute" as a shortcut icon in the form of a mouse pointer. If the pointer is on the shortcut in the form of the mouse pointer, the service server 100 may cause the shortcut icon in the form of the mouse pointer to be displayed as a shortcut icon in the form of a character of "Click." Here, if the user selects any one of the pre-input processes and selects a shortcut for the "add process with click attribute," the selected user input may be applied below the process selected by the process of a click attribute.

This allows a beginner who is not well versed in the flowchart GUI to recognize what function a shortcut icon has for the next input recommendation information displayed in the flowchart GUI, and thus, it is easier to add a user input.

Figure 6:
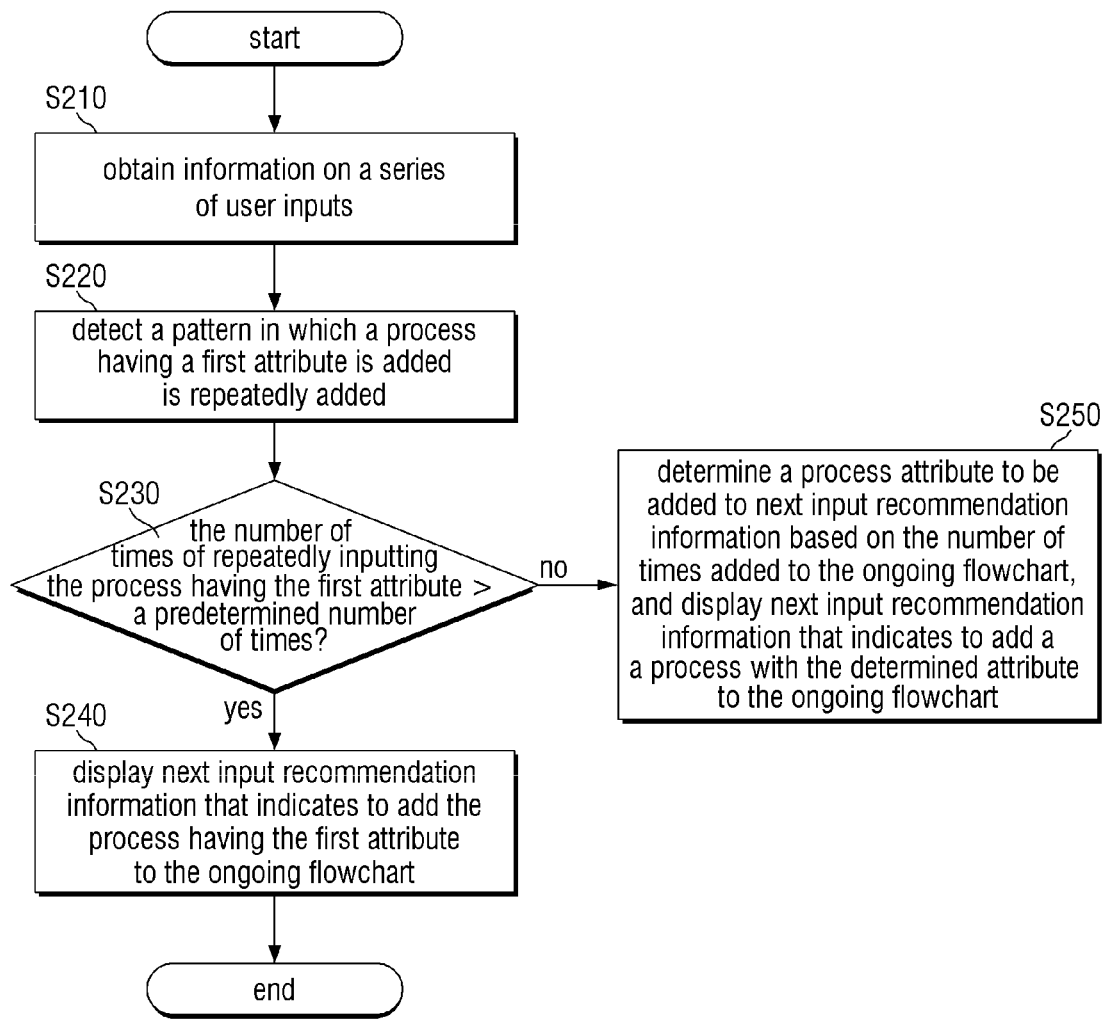
FIGS. 6 to 7 are flowcharts illustrating a modified example of the method described with reference to FIG. 2.
Figure 7:
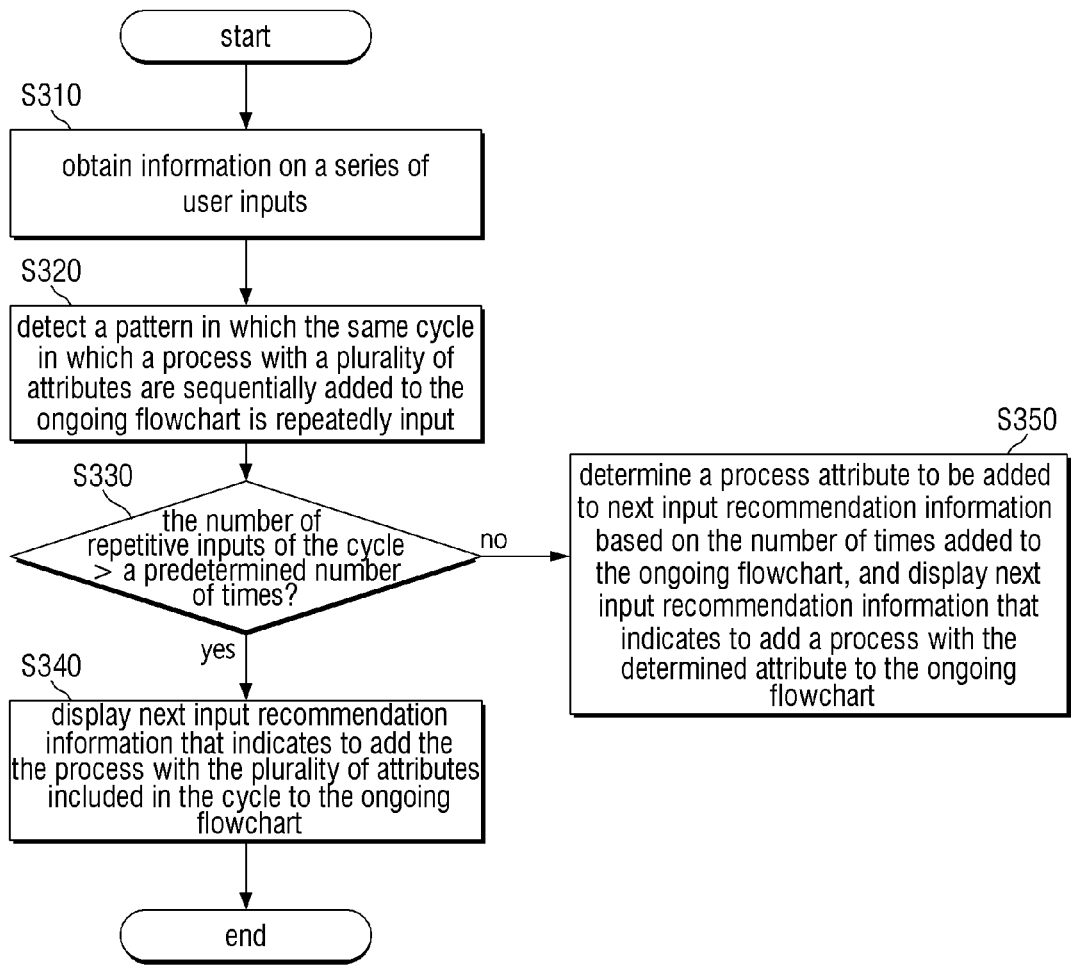

With the next input recommendation information 30 displayed on the screen in the embodiment, a user who specializes in the flowchart GUI does not need to repeat the list area on the top or left and right of the screen to add components. Therefore, it may effectively reduce a time required to produce a result. In addition, even beginners who do not handle the flowchart GUI well may obtain an effect that may easily produce a result by being recommended suitable next user inputs based on their user input patterns. Referring to FIGS. 6 and 7 below, the embodiment will be described in more detail with reference to some examples of the series of user inputs.

First, a description will be given with reference to FIG. 6. FIG. 6 is a flowchart for describing an operation according to the embodiment when a process of a specific attribute is repeatedly included in an ongoing flowchart.

Referring to FIG. 6, first, information on a series of user inputs through the flowchart GUI is obtained (S210).

Thereafter, the information on the series of user inputs obtained in step S210 is analyzed, and a pattern in which a user input to which a process having a first attribute is added is repeatedly input is detected (S220).

It may be determined whether the number of times of repeatedly inputting the process having the first attribute exceeds a predetermined number of times (S230). For example, if the "add process with click attribute" is entered repeatedly, the service server 100 may detect a pattern in which the "add process with click attribute" is repeatedly input, and measure the number of times that the "add process with click attribute" is repeatedly input. Here, If the "add process with click attribute" has been repeatedly input five times and the predetermined number is four times, it may be determined that the user input of the "add process with click attribute" has exceeded the predetermined number of times. When the number of consecutively repeated inputs to which a process with a particular attribute is added to the ongoing flowchart exceeds the reference value, such a series of user inputs is determined to satisfy the first pattern.

After then, when a pattern formed by the series of user inputs includes a first pattern and the last user input is a user input for adding a process having a first attribute, next input recommendation information that indicates to add the process having the first attribute to the ongoing flowchart may be displayed (S240). For example, for example, for the "add process with click attribute" determined to exceed the predetermined number of times, when the last user input is the "add process with click attribute," the service server 100 may display a next input recommendation information that indicates to add the process of the click attribute to the ongoing flowchart of the GUI.

If the pattern formed by the series of user input does not include the first pattern in step S230, the service server 100 may determine a process attribute to be added to next input recommendation information based on the number of times added to the ongoing flowchart, and may display next input recommendation information that indicates to add the process of the determined attribute to the ongoing flowchart (S250). For example, when the pattern formed by the user input does not include the first pattern, the service server 100 may display next input recommendation information indicating the "add process with click attribute" having the high number of user inputs added to the ongoing flowchart if the number of user inputs added to the ongoing flowchart is 10 times for the "add process with click attribute" and 4 times for an "add process with text input attribute."

In another embodiment, the service server 100 may display next input recommendation information corresponding to the first pattern, and next input recommendation information that indicates to add a process to be added to the next input recommendation information determined based on the number of times added to the ongoing flowchart, together in the flowchart GUI, in which the next input recommendation information corresponding to the first pattern may be displayed with the top priority.

Here, displaying with the top priority means displaying it in an area closest to the pointer when providing one or more recommended user inputs in the form of shortcuts in next input recommendation information in the form of a toolbar. Next, a configuration for displaying next input recommendation information when a user input with a plurality of attributes is repeatedly input will be described with reference to FIG. 7.

FIG. 7 is a flowchart illustrating a process of displaying next input recommendation information when a cycle consisting of sequentially adding processes with different attributes is repeatedly input according to an embodiment of the present invention.

Referring to FIG. 7, first, information on a series of user inputs through the flowchart GUI is obtained (S310).

After that, the service server 100 may analyze the information on the series of user inputs obtained in step S310 and detect a second pattern in which the same cycle in which a process with a plurality of attributes are sequentially added to the ongoing flowchart is repeatedly input equal to or more than a predetermined number of times (S320).

After that, the service server 100 may determine whether the number of consecutive and repetitive inputs of the same cycle, in which a process having a plurality of attributes is subsequently added to the ongoing flowchart, exceeds a predetermined number of times (S330).

For example, if a cycle ["add process with click attribute," "add process with text input attribute," and "add process with click attribute"] is repeatedly input, the service server 100 may detect a pattern in which the cycle ["add process with click attribute," "add process with text input attribute," and "add process with click attribute"] is repeatedly input, and may measure the number of times the cycle is repeatedly input. Here, when the number of cycles repeatedly input is 5 times and the predetermined number of times is 4 times, it is determined that the number of times the cycle ["add process with click attribute," "add process with text input attribute," and "add process with click attribute"] is repeatedly input exceeds the predetermined number of times, and it is determined that such a series of user inputs satisfies the second pattern.

Then, if the pattern formed by the series of user inputs includes the second pattern and the last user input is a user input of adding one of the processes with the plurality of attributes included in the cycle, it may display next input recommendation information that indicates to add next processes included in the cycle to the ongoing flowchart. For example, the series of user inputs has the second pattern in which the cycle ["add process with click attribute," "add process with text input attribute," and "add process with click attribute"] is repeated and the last user input is the "add process with text input attribute," it may display next input recommendation information indicating the "add process with click attribute" which is likely to be input after the user input of the "add process with text input attribute."

Hereinafter, a method for recommending a next user input according to another embodiment of the present invention will be described with reference to FIG. 8.

Figure 8:
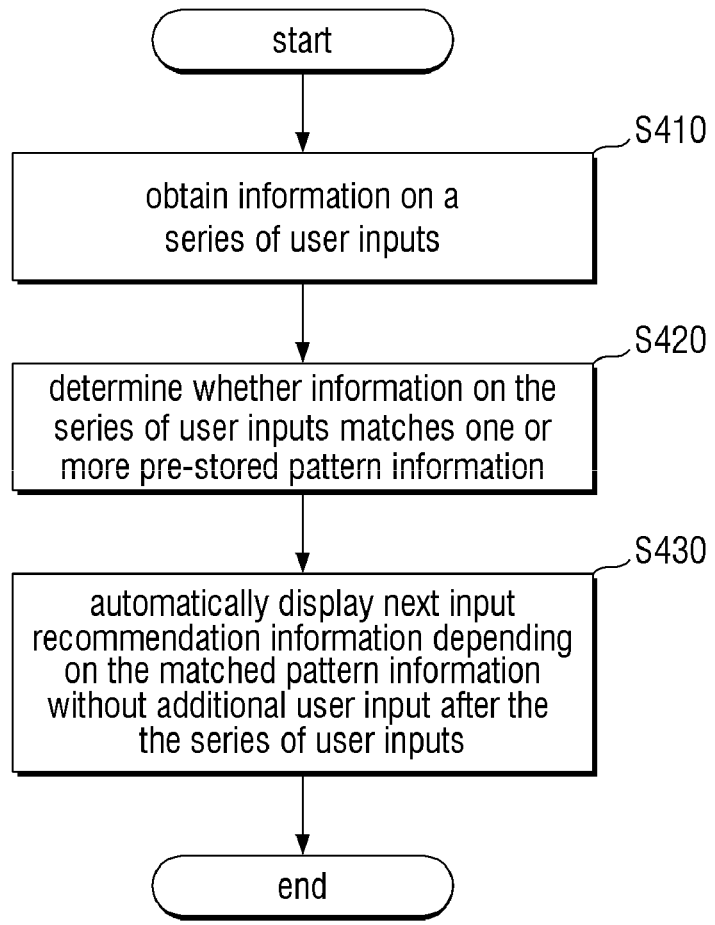
FIG. 8 is a flowchart illustrating a method for recommending a next user input according to another embodiment of the present invention.

Referring to FIG. 8, first, information on a series of user inputs entered through a GUI is obtained (S410).

After step S410, it is determined whether a pattern matching the series of user inputs is present among a plurality of patterns included in one or more pre-stored pattern information (S420). The determination may be performed at a service server or at a user terminal.

For example, an analyzed pattern of the series of the user inputs is the repetition of ["add process 10 with click attribute—rename 11 of process 10—reset target image 12 of process 10"] and it include a repeated cycle, it may be determined whether such a pattern exists among the plurality of patterns included in pre-stored pattern information. Here, when the number of patterns to be compared is large, a time required for the determination may be long, and thus, a pattern to be compared may be previously limited to being included in specific pattern information. For example, the pattern to be compared may be limited to that included in pattern information of a user of a specific attribute or a specific user depending on a predetermined setting of the user. After step S420, next input recommendation information depending on the pattern information matched in step S420 may be automatically displayed without additional user input after the series of user inputs.

In other words, according to the embodiment, next user input suitable for a pattern configured by a user input of a current user is recommended based on pattern information of professionals for the flowchart GUI, so that the current user may quickly learn a usage pattern of the professionals.

In some embodiments of the present invention, next user input for inputting a plurality of manipulations at one time is recommended, and if such a recommendation is selected, the plurality of manipulations may be performed at once. Hereinafter, the embodiment will be described with reference to FIGS. 9 to 11.

Figure 9:
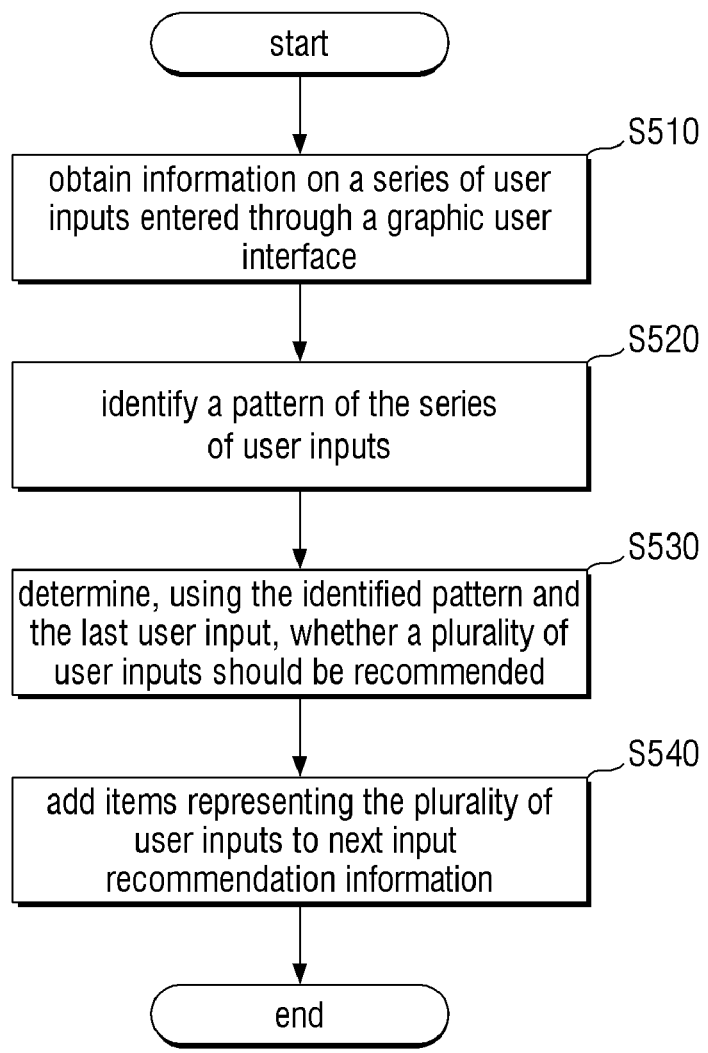
FIG. 9 is a flowchart illustrating a modified example of the method described with reference to FIG. 8.

First, referring to FIG. 9, information on a series of user inputs entered through a flowchart GUI is obtained (S510).

Then, a pattern of the series of user inputs is identified (S520). For example, the pattern may be identified through analysis of a series of user inputs of a current user, or the patterns corresponding to the series of user inputs of the current user may be identified among patterns included in pre-stored pattern information.

Figure 10:
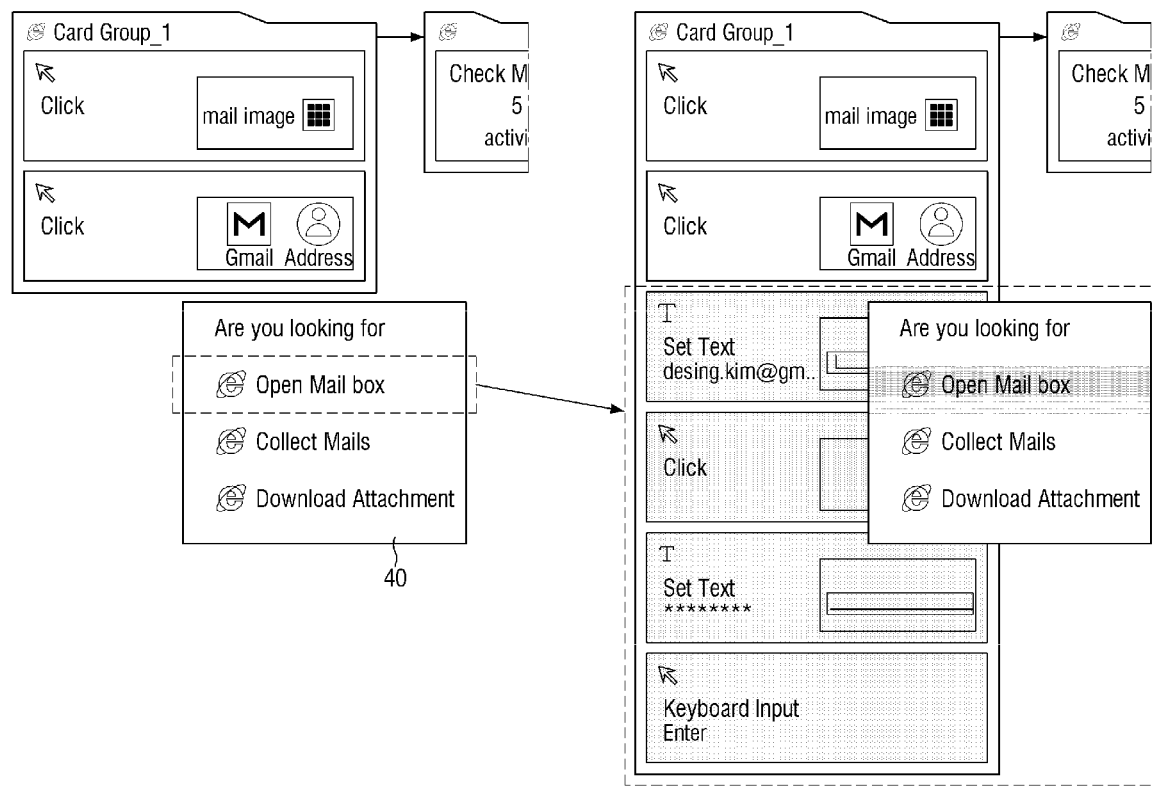
FIG. 10 is a diagram illustrating an example in which a next input composed of a plurality of manipulations is recommended, and content which is working on is updated when the recommended next input is selected, in some embodiments of the present invention.

Then, it is determined whether a plurality of user inputs should be recommended using the identified pattern and the last user input (S530). For example, referring to FIG. 10, if the series of user inputs entered through the flowchart GUI are "add first process with click attribute—set first target image" and "add second Process with click attribute—stet second target image," and, among the patterns included in the pre-stored pattern information, a pattern including [add first process with click attribute—setting first target image—add second process with click attribute—setting second target image—first group of user input], a pattern including [add first process with click attribute—set first target image—add second process with click attribute—set second target image—second group of user input], and a pattern including [add first process with click attribute—set first target image—add second process with click attribute—set second target image setting—third group of user input] exist, in the current situation finished up to the setting of the second target image, as a next user input, a first group of user inputs, a second group of user inputs, and a third group of user inputs may all be recommended. FIG. 10 shows next input recommendation information 40 including first group of user inputs (Open Mail Box), second group of user inputs (Collect Mails), and third group of user inputs (Download Attachment), respectively as next user input recommendations. The group of user input referred to herein includes two or more user inputs.

As shown in FIG. 10, the next input recommendation information 40 may display items indicating each group of user input in a list format. When the user positions the pointer on one of the items, a plurality of user inputs included in the corresponding group of user input may be temporarily displayed through a pop-up display or the like. When the user selects one of the groups of user inputs, a result of the plurality of user inputs included in the selected group of user inputs will be reflected in the ongoing flowchart.

For example, when a position of the pointer is positioned above an item of the first group of user inputs, "Open Mail Box," as shown in FIG. 10, "Add process with text input attribute—add process with click attribute—add process with text input attribute—input enter key" included in the first group of user inputs may be displayed for a while. When the first group of user inputs is selected from the user, a series of user inputs, "add process with text input attribute—add process with click attribute—add process with text input attribute—input enter key," will all be processed without additional user input after selection of the first group of user inputs.

Figure 11:
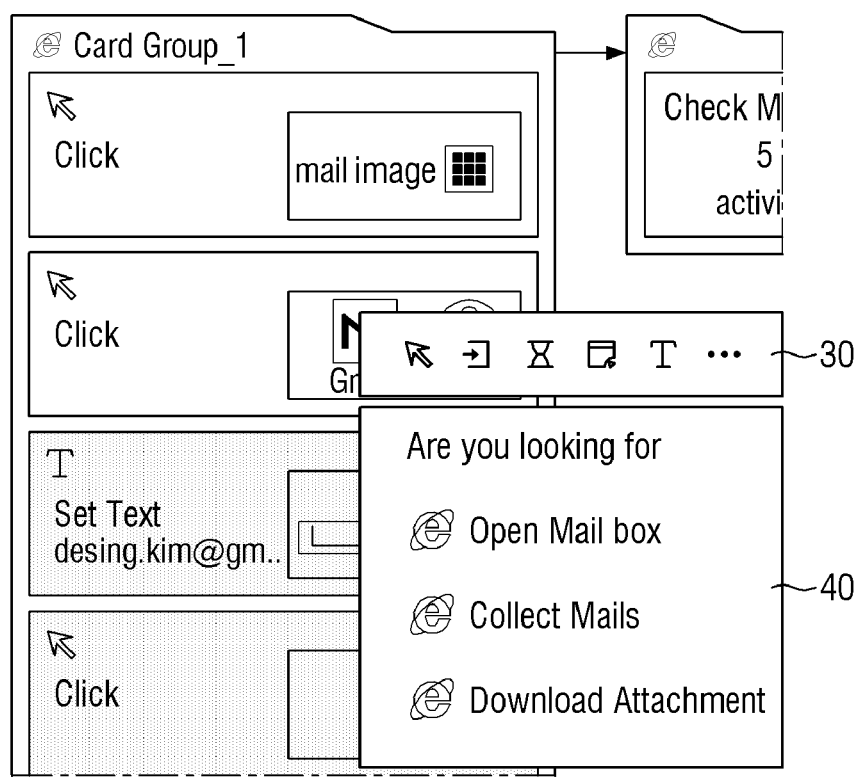
FIG. 11 is a diagram illustrating that in some embodiments of the present invention, a first next input composed of a single manipulation and a second next input composed of a plurality of manipulations are recommended together.

When following one of the identified patterns, a plurality of user inputs (i.e. a group of user inputs) should be recommended by considering the pattern and the last user input. Further, when following other identified patterns, one user input may be recommended by considering the pattern and the last user input. In this case, it may be understood that next input recommendation information depending on the matched pattern information includes a first GUI object that indicates to sequentially batch process a plurality of user inputs sequentially in an order according to a first pattern that matches the information on the series of user inputs, and a second GUI object that indicates to process a single user input according to a second pattern that matches the information on the series of user inputs. However, even in such a case, it is preferable to display the next input recommendation information such that the first GUI object is disposed closer to the pointer than the second GUI object. This is because batch processing a group of user inputs is more likely to contribute to faster work. FIG. 11 shows a first GUI object 40 and a second GUI object 30.

Hereinafter, a method for recommending a next user input according to another embodiment of the present invention will be described with reference to FIG. 12.

Figure 12:
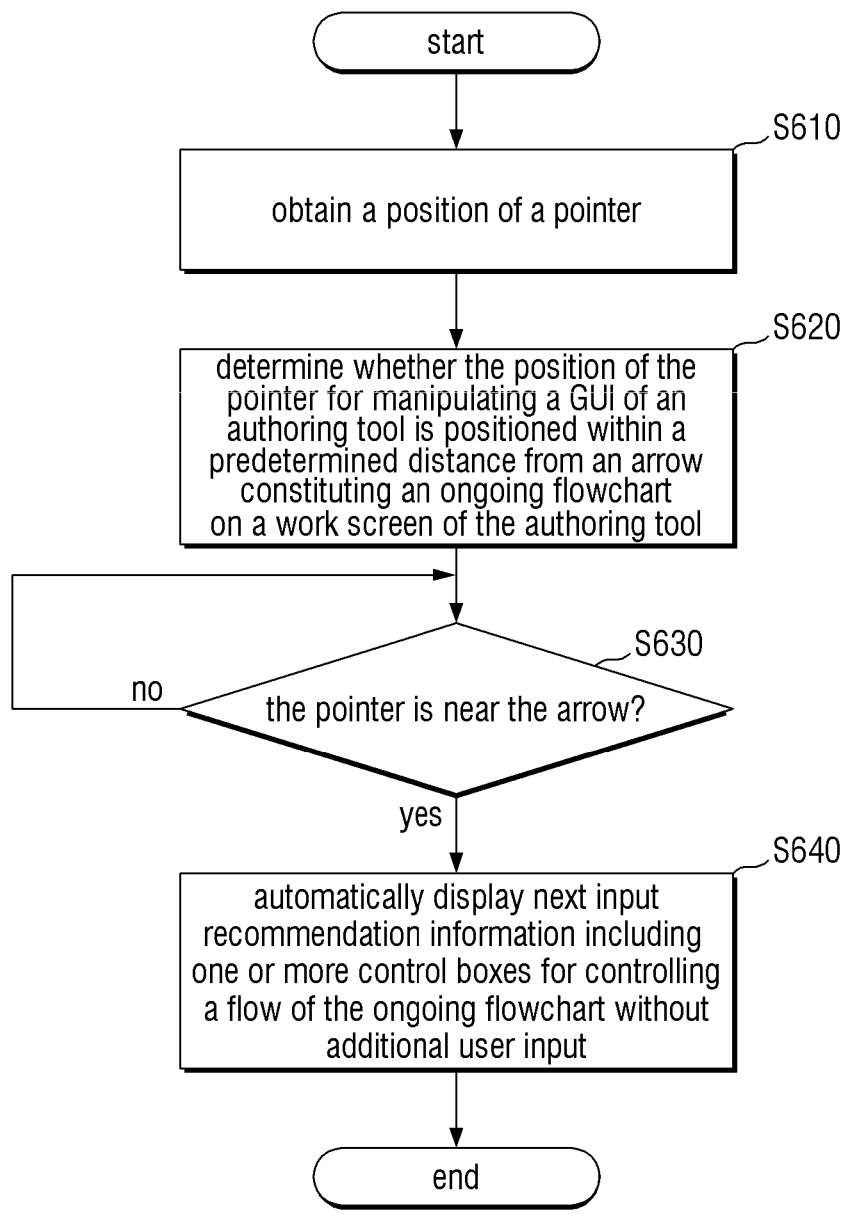
FIG. 12 is a flowchart illustrating a method for recommending a next user input according to another embodiment of the present invention.

First, referring to FIG. 12, a position of a pointer for manipulating a GUI of an authoring tool is obtained (S610).

Then, it is determined whether the position of the pointer for manipulating the GUI of the authoring tool is positioned within a predetermined distance from an arrow constituting an ongoing flowchart displayed on a work screen of the authoring tool (S620 and S630).

Then, if the pointer is positioned within the predetermined distance from the arrow, next input recommendation information including one or more control boxes for controlling to define a flow of the ongoing flowchart is automatically displayed without additional user input (S640).

For a flowchart that expands in both directions unlike one-way expanding manner in which processes with various kinds of attributes are added to a flowchart process group, it shows a pattern for adding a flowchart process downwards and generating new process groups or branches using arrows in the left and right directions. In other words, when a flowchart expands in both directions, and the pointer moves to the left and right near the arrow, it may be intended to expand the flowchart in the left and right directions.

Figure 13:
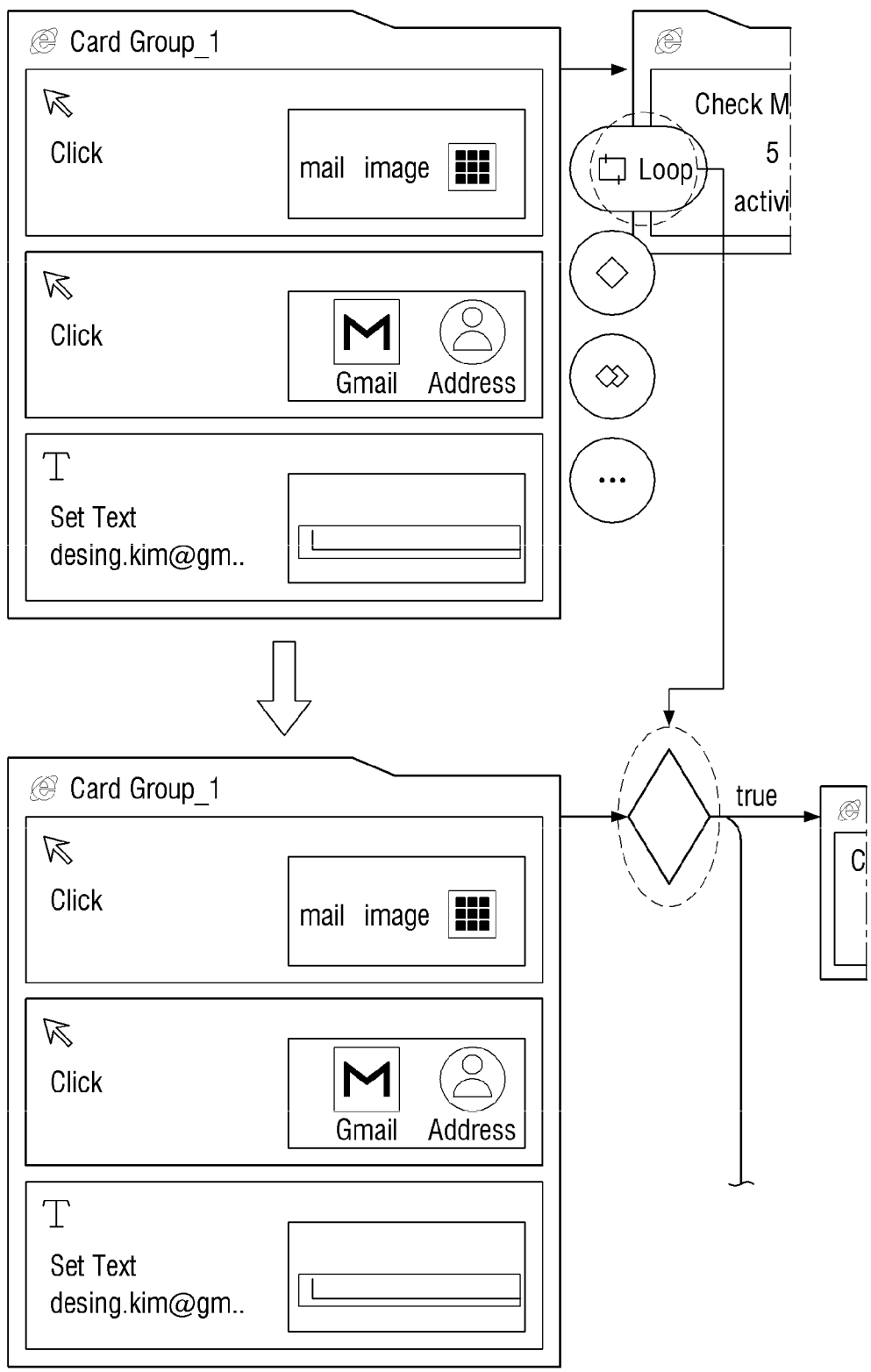
FIG. 13 is an exemplary diagram explaining the method of FIG. 12.

Thus, when the pointer is positioned near the arrow as shown in FIG. 13, next input recommendation information may be displayed that includes one or more control boxes that may be used to expand the flowchart in both directions.

In an embodiment, as shown in FIG. 13, next input recommendation information including shortcut icons for executing the one or more control boxes may be displayed. When the position of the pointer is positioned on one of the shortcut icons corresponding to the one or more control boxes, an attribute of the control box may be displayed by expanding the shortcut icon to the left and right.

In other words, if a pattern for the user's user input has a pattern that expands in one direction, next input recommendation information is displayed that includes information to add, change, and modify flowchart processes, such as an input to add processes to the flowchart, an input to rename processes, an input to reset target images, and an input to change group names. If the pattern for the user's user input has a pattern that expands in both directions, next input recommendation information is displayed that includes an input to add a control box to the flowchart for bidirectional expansion. Therefore, appropriate information may be recommended depending on a situation to create contents in the form of a flowchart.

In some embodiments, next input recommendation is provided information including shortcut icons for one or more control boxes, in which after the next input recommendation is provided, the next input recommendation information may not be displayed when a user input for selecting an area other than the next input recommendation information occurs.

The methods according to the embodiments of the present invention described so far may be performed by execution of a computer program implemented in computer readable code. The computer program may be transmitted to and installed on the second computing device from the first computing device via a network such as the Internet, and thus may be used in the second computing device. The first computing device and the second computing device include all of a server device, a physical server belonging to a server pool for cloud services, and a stationary computing device such as a desktop PC.

Hereinafter, a hardware configuration of a computing device according to another embodiment of the present invention will be described with reference to FIG. 14.

Figure 14:
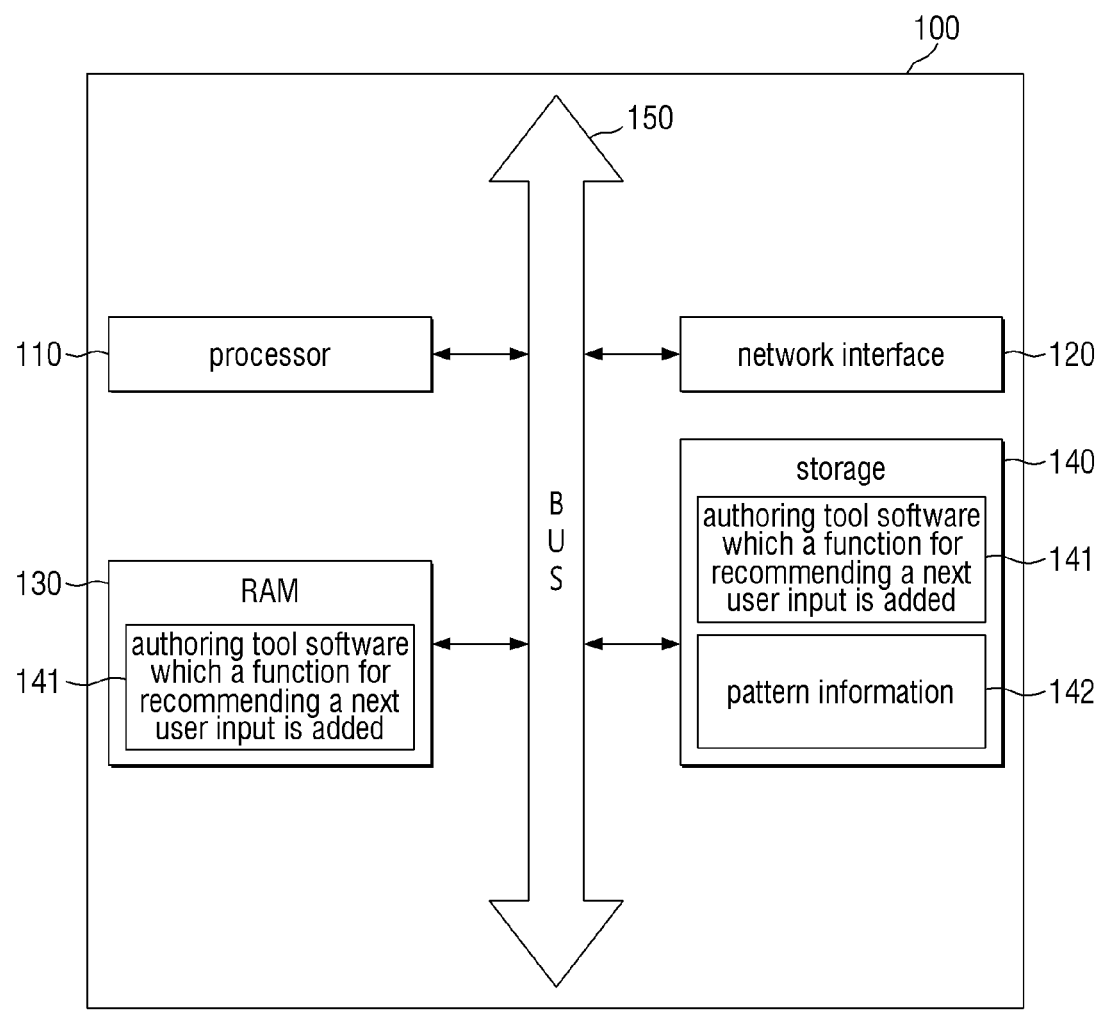
FIG. 14 is a hardware block diagram of a computing device according to another embodiment of the present invention.

Referring to FIG. 14, a computing device 100 according to the embodiment may include one or more processors 110, a network interface 120, a memory 130 for loading a computer program executed by the processor 110, and a storage 140 for storing a flowchart pattern extraction software 141 and pattern information 142. However, FIG. 14 illustrates only components related to an embodiment of the present invention. Accordingly, it will be appreciated by those skilled in the art that the present invention may further include other general-purpose components in addition to the components illustrated in FIG. 14.

The processor 110 controls the overall operation of each component of the service server 100. The processor 210 may be configured to include a central processing unit (CPU), a microprocessor unit (MPU), a micro controller unit (MCU), or any type of processor well known in the art. In addition, the processor 110 may perform operations on at least one application or program for executing a method according to embodiments of the present invention.

The network interface 120 supports wired and wireless Internet communication of the computing device 100. In addition, the network interface 120 may support various communication methods other than Internet communication. To this end, the network interface 120 may be configured to include a communication module well known in the art.

The network interface 120 may receive information on a series of user inputs through a flowchart GUI output to the user terminal 400 through the network 300 shown in FIG. 1.

The memory 130 stores various data, commands, and/or information.

The memory 130 may load the authoring tool software 141 to which a function for recommending a next user input is added from the storage 140 to execute a method for recommending a next user input according to embodiments of the present invention. Although a RAM is illustrated as an example of the memory 130 in FIG. 14, any components capable of loading one or more programs 141 may be applied.

The storage 140 stores the pattern information 142 and the authoring tool software 141 to which the function for recommending the next user input is added.

The storage 140 may be configured to include a non-volatile memory such as a read only memory (ROM), an erasable programmable ROM (EPROM), an electrically erasable programmable ROM (EEPROM), or a flash memory, a hard disk, a removable disk, or any form of computer readable recording medium well known in the art to which the present invention belongs.

The authoring tool software 141 with the function for recommending the next user input may perform operations: to obtain information on a series of user inputs entered through a GUI; to analyze the information on the series of user inputs to identify patterns formed by the series of user inputs; and when a pattern is identified, to automatically display next input recommendation information determined depending on the identified pattern and the last user input of the series of user inputs without additional user input after the series of user inputs.

In another embodiment, the authoring tool software 141 with the function for recommending the next user input may perform operations: to obtain information on a series of user inputs entered through a GUI; to determine whether a pattern matching the information on the series of user inputs is present among a plurality of patterns included in pre-stored pattern information; and when there is the matched pattern information depending on the determination, to automatically displaying next input recommendation information depending on the matched pattern information without additional user input after the series of user inputs.

In another embodiment, the authoring tool software 141 with the function for recommending the next user input may perform operations: to determine whether a position of a pointer for manipulating a GUI of the authoring tool for creating contents having a flowchart form is positioned within a predetermined distance from an arrow constituting an ongoing flowchart displayed on a work screen of the authoring tool; and when the pointer is positioned within the predetermined distance from the arrow, to automatically displaying next input recommendation information including one or more control boxes for controlling to define the flow of the ongoing flowchart without additional user input.

The computer program may be stored in a recording medium such as a DVD-ROM or a flash memory device.

The foregoing is illustrative of the present invention and is not to be construed as limiting thereof. Although a few embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A method for recommend a next user input, the method being performed by a computing device, and comprising:

obtaining information on a series of user inputs entered through a graphic user interface (GUI);

analyzing the information on the series of user inputs to identify a pattern formed by the series of user inputs; and when the pattern is identified, automatically displaying next input recommendation information determined depending on the identified pattern and a last user input of the series of user inputs without additional user input after the series of user inputs, wherein the GUI is a GUI of an authoring tool to create contents in the form of a flow chart;

the identified pattern comprises a first pattern in which a user input to which a process having a first attribute is added to an ongoing flowchart is consecutively and repeatedly input equal to or more than a predetermined number of times, the ongoing flowchart being shown in a work screen of the authoring tool; and the automatically displaying comprises:

when the pattern formed by the series of user inputs includes the first pattern and the last user input is a user input for adding the process having the first attribute, displaying the next input recommendation information that indicates to add the process having the first attribute to the ongoing flowchart, and when the pattern formed by the series of user inputs does not include the first pattern, determining a high frequency process attribute to be added to the next input recommendation information based on the number of times added to the ongoing flowchart, and displaying the next input recommendation information that indicates to add a process with the high frequency process attribute to the ongoing flowchart.

2. The method of claim 1, wherein the automatically displaying of the next input recommendation information determined depending on the identified pattern and the last user input of the series of user inputs without additional user input after the series of user inputs, comprises:
  displaying the next input recommendation information at a position within a predetermined distance from a pointer for manipulating the graphical user interface.

3. The method of claim 1, wherein the identification of the pattern formed by the series of user inputs comprises:
  in response to the last user input in which information writing for a process included in the ongoing flowchart shown in the work screen of the authoring tool is completed, analyzing the information on the series of user inputs and identifying the pattern formed by the series of user inputs.

4. The method of claim 1, wherein the automatically displaying of the next input recommendation information determined depending on the identified pattern and the last user input of the series of user inputs without additional user input after the series of user inputs, further comprises:
  determining a high frequency process attribute to be added to the next input recommendation information based on the number of times added to the ongoing flowchart, and further displaying the next input recommendation information that indicates to add a process with the high frequency process attribute to the ongoing flowchart as a subordinate of the next input recommendation information that indicates to add the process with the first attribute to the ongoing flowchart.

5. The method of claim 1, wherein the identified pattern comprises a second pattern in which a cycle is repeatedly input equal to or more than a predetermined number of times, the cycle consisting of sequentially adding processes with a plurality of different attributes to the ongoing flowchart; and
  the automatically displaying of the next input recommendation information determined depending on the identified pattern and the last user input of the series of user inputs without additional user input after the series of user inputs, comprises:
    when the pattern formed by the series of user inputs includes the second pattern and the last user input is a user input for adding a process with the last attribute included in the cycle to the ongoing flowchart, displaying the next input recommendation information that indicates to add the process with the plurality of attributes included in the cycle to the ongoing flowchart.

6. The method of claim 1, further comprising:
  obtaining a position of a pointer;
  determining whether the position of the pointer for manipulating a graphical user interface (GUI) of the authoring tool is positioned within a predetermined distance from an arrow constituting an ongoing flowchart displayed on a work screen of the authoring tool; and
  when the pointer is positioned within the predetermined distance from the arrow, automatically displaying next input recommendation information including a control box for defining a flow of the ongoing flowchart without additional user input.

7. A method for recommend a next user input, the method being performed by a computing device, and comprising:
  obtaining information on a series of user inputs entered through a graphic user interface (GUI);
  determining whether a pattern matching the information on the series of user inputs is present among a plurality of patterns included in pre-stored pattern information; and
  when the pattern matching the information on the series of user inputs exists, automatically displaying next input recommendation information depending on the matched pattern without additional user input after the series of user inputs,
  wherein the GUI is a GUI of an authoring tool to create contents in the form of a flow chart;
  the matched pattern comprises a second pattern in which a cycle is repeatedly input equal to or more than a predetermined number of times, the cycle consisting of sequentially adding processes with a plurality of different attributes to an ongoing flowchart, the ongoing flowchart being shown in a work screen of the authoring tool, and
  the automatically displaying comprises:
    when the pattern formed by the series of user inputs includes the second pattern and a last user input of the series of user inputs is a user input for adding a process with the plurality of attributes included in the cycle to the ongoing flowchart, displaying the next input recommendation information that indicates to add the process with the plurality of attributes included in the cycle to the ongoing flowchart.

8. The method of claim 7, wherein the pattern information consists of a pattern identified in a series of user inputs of another user other than a user of the computing device, and is downloaded to the computing device via a network.

9. The method of claim 7, wherein the determining whether the pattern matching the information on the series of user inputs is present among the plurality of patterns included in the pre-stored pattern information, comprises:
  in response to the last user input in which information writing for a process included in the ongoing flowchart shown in the work screen of the authoring tool is completed, determining whether there is a match between the information on the series of user inputs and one or more pre-stored pattern information.

10. The method of claim 9, wherein the next input recommendation information depending on the matched pattern information indicates to sequentially batch process a plurality of user inputs sequentially in an order according to a pattern matching the information on the series of user inputs.

11. The method of claim 9, wherein the next input recommendation information depending on the matched pattern information comprises a first GUI object that indicates to sequentially batch process a plurality of user inputs sequentially in an order according to a first pattern that matches the information on the series of user inputs, and a second GUI object that indicates to process a single user input according to a second pattern that matches the information on the series of user inputs.

12. The method of claim 7, further comprising:
  obtaining a position of a pointer;
  determining whether the position of the pointer for manipulating a graphical user interface (GUI) of the authoring tool is positioned within a predetermined distance from an arrow constituting an ongoing flowchart displayed on a work screen of the authoring tool; and
  when the pointer is positioned within the predetermined distance from the arrow, automatically displaying next input recommendation information including a control box for defining a flow of the ongoing flowchart without additional user input.

* * * * *